United States Patent
Lynch

[11] Patent Number: 6,160,235
[45] Date of Patent: Dec. 12, 2000

[54] MEASUREMENT OF WELDS

[75] Inventor: David Matthew Lynch, Oxfordshire, United Kingdom

[73] Assignee: Carnaudmetalbox (Holdings) USA Inc., Wilmington, Del.

[21] Appl. No.: 09/269,504
[22] PCT Filed: Dec. 8, 1997
[86] PCT No.: PCT/GB97/03384
§ 371 Date: Mar. 29, 1999
§ 102(e) Date: Mar. 29, 1999
[87] PCT Pub. No.: WO98/26897
PCT Pub. Date: Jun. 25, 1998

[30] Foreign Application Priority Data

Dec. 16, 1996 [GB] United Kingdom ............... 9626065

[51] Int. Cl.⁷ .................................................. B23K 11/25
[52] U.S. Cl. ........................ 219/64; 219/109; 219/110
[58] Field of Search ............................... 219/64, 109, 110

[56] References Cited

U.S. PATENT DOCUMENTS

| 4,535,215 | 8/1985 | Kliesch et al. | 219/110 |
| 4,652,715 | 3/1987 | Kitamura et al. | 219/64 |
| 5,064,982 | 11/1991 | Kabasawa et al. | 219/64 |

FOREIGN PATENT DOCUMENTS

| 0381312 | 1/1990 | European Pat. Off. |
| 0438204 | 1/1990 | European Pat. Off. |

Primary Examiner—Clifford C. Shaw
Attorney, Agent, or Firm—Diller, Ramik & Wight, P

[57] ABSTRACT

Resistance welds on overlapped sheets of metal, such as the welded side seam of 3 piece cans, are monitored by measuring the width of the extrusion (5, 6) formed by material flowing out from the edge of the overlapped sheets (1, 2) caused by the welding process. The width of the extrusion (5, 6) is interpreted in terms of the temperature of the weld, and the welding process can be adjusted accordingly. The measurement of the extrusion width can be done optically.

10 Claims, 2 Drawing Sheets

MEASUREMENT OF WELDS

BACKGROUND OF THE INVENTION

This invention relates to a method of measuring the quality of a resistance weld, typically the welded joint which forms the side seam of a metallic can.

Applicant' earlier patents EP 0381312B and EP 0438204B are directed to techniques for monitoring resistance welds in metallic cans, for example by measuring the relative movement of the electrode wheels of the resistance welding apparatus. The present invention provides a further method of measuring the quality of resistance welds, which is capable of generating additional information concerning the welding process.

SUMMARY OF THE INVENTION

Accordingly there is provided a method of measuring the quality of a resistance weld between two overlapping sheets of metal, the formation of the weld having caused material to be flowed out adjacent the edge of each overlapped sheet to form an extrusion, the method including the steps of:

i) measuring the width of the weld extrusion on at least one side of the weld;

ii) generating a signal representative of the width of the weld extrusion, and iii) interpreting the signal in terms of the temperature of the weld.

The weld extrusion is the material which is formed out of the weld interface during the weld process and is normally present adjacent the edge of each overlapped plate being welded. Applicants have discovered that, surprisingly, the width of the weld extrusion gives a direct indication of the temperature at which the weld was carried out. Accordingly, for a continuous process such as a can welding line, the method conveniently includes the additional step of adjusting the temperature of the weld in response to the signal generated representing the width of the weld extrusion.

Preferably the measurement of the width of the weld extrusion is an optical measurement. Conveniently the optical measurement includes the steps of illuminating the area of the weld and measuring the light reflected from the weld extrusion. Alternatively or additionally, the optical measurement includes the steps of illuminating the area of the weld with one or more lines of light at an angle to the longitudinal axis of the weld and in a first plane at an angle to the plane in which the weld lies, viewing the one or more lines in a second plane at an angle to the first plane, and calculating the apparent deviation of the one or more lines as they pass over the weld extrusion. Typically the method includes the step of illuminating the area of the weld with a grid or pattern of lines of light.

The method preferably includes the step of measuring the width of the weld extrusion on both faces of the resistance weld. Where the resistance weld is the side seam in a metallic can, this will involve measuring the width of the weld extrusion on both the internal and external faces of the can. The weld overlap may also be measured as an additional step of the present method.

The invention will now be further described, by way of example only, with reference to the accompanying drawings, in which:

DESCRIPTION OF THE PREFERRED ENNOBLEMENTS

Figure 1:
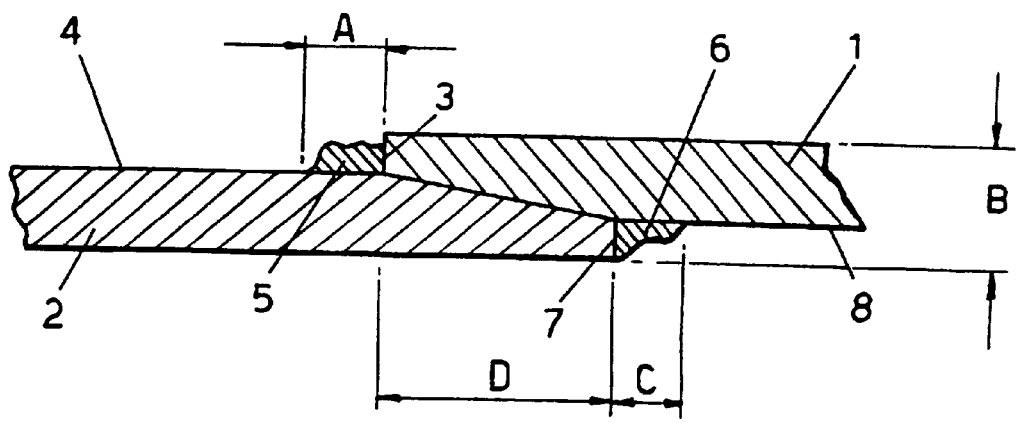
FIG. 1 is a schematic sectional diagram showing a typical weld.

Referring to FIG. 1 there is shown, in highly idealised form, a weld between a first plate 1 and a second plate 2, typically the two sides of a welded side seam in a cylindrical can. Extending from the edge 3 of the first plate and adjacent the surface 4 of the second plate is a first extrusion 5. Extrusion 5 will extend along the line of the weld in a continuous, but not necessarily regular fashion. On the opposite face of the weld a second extrusion 6 will be present extending from the edge 7 of the plate 2 and adjacent the opposite surface 8 of the plate 1.

In order to analyse the quality of the weld it is desirable to determine certain dimensions, namely the width A of the extrusion 5; the mashed thickness B of the weld (i.e. the distance after welding between the surfaces 4 and 8); the width C of the extrusion 6; and the weld overlap D (i.e. the distance between the edges 3 and 7 of the two plates).

Figure 2:
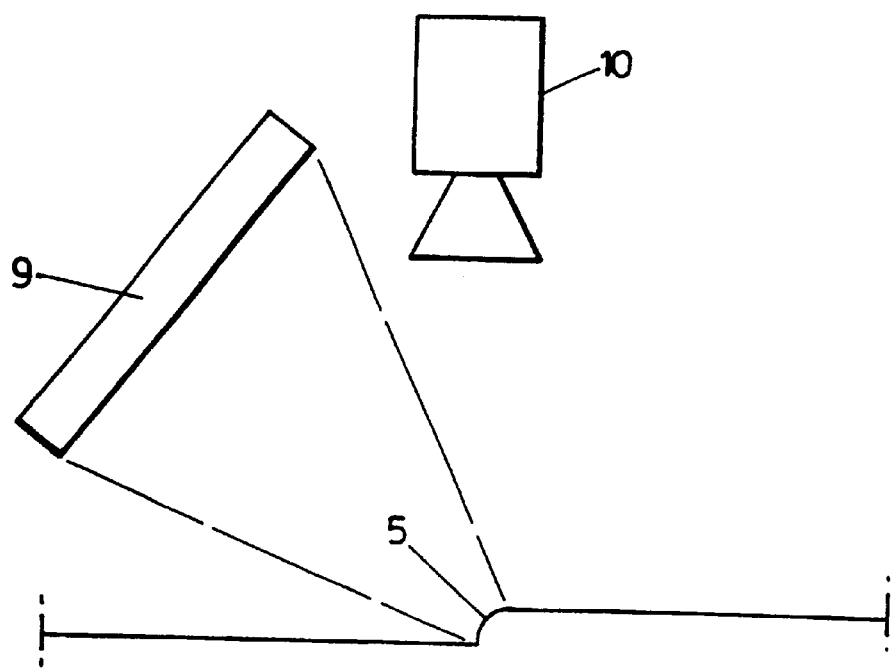
FIG. 2 is a schematic diagram showing a first embodiment of optical measurement in accordance with the invention.

FIG. 2 shows one arrangement for optically measuring the width of an extrusion 5. Light source 9 illuminates the weld at a spread of incident angles from say, 10° to 80° above the horizontal surface 8 of the plate. A camera 10 mounted above the weld detects the light reflected from the extrusion 5. The amount of light detected is representative of the width of the extrusion 5, and hence the temperature used to form the weld. The camera can be used to generate a signal which can be displayed, or used to provide feedback control to a welding line in order to compensate for any deviations from the ideal temperature for forming the weld.

Figure 3:
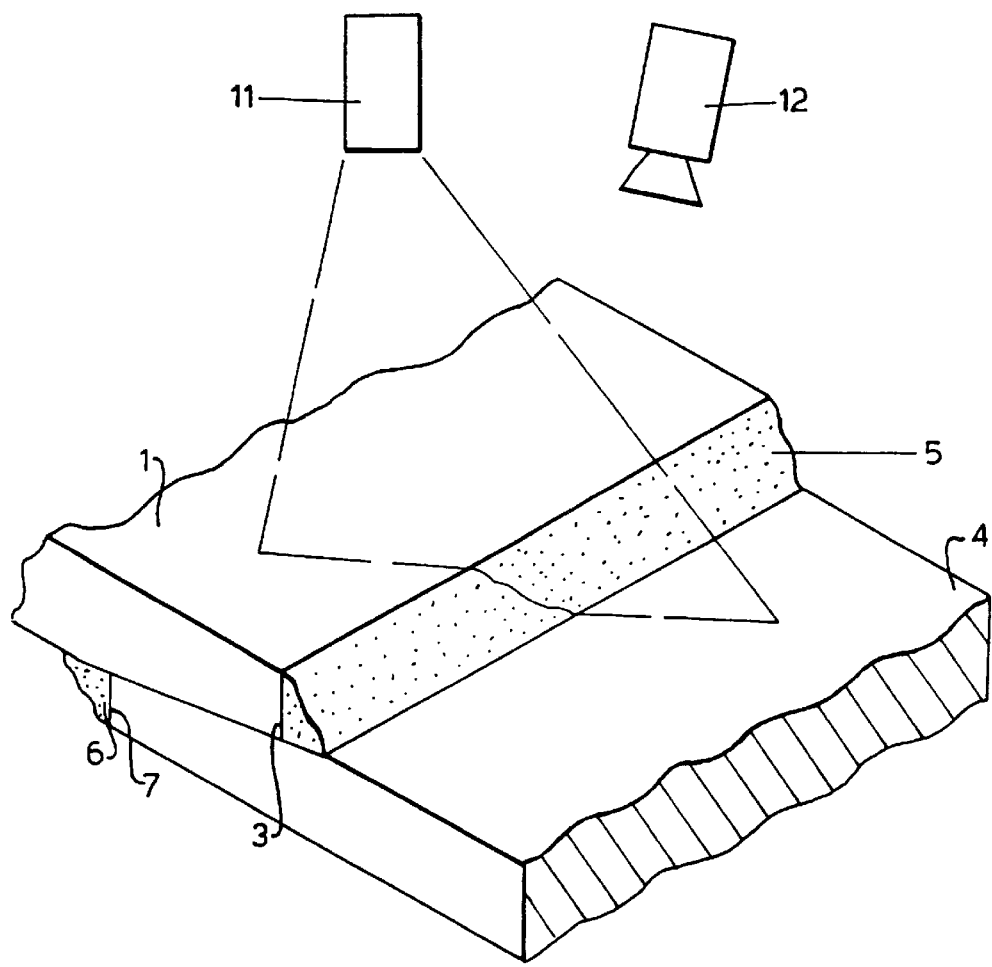
FIG. 3 is a schematic diagram showing a second embodiment of optical measurement in accordance with the invention.

FIG. 3 shows a different arrangement of optical measurement, which can be used as an alternative or in addition to that of FIG. 2. In FIG. 3 a light source 11 generates a line 12 of light which is used to illuminate the weld at an angle to the longitudinal axis of the weld. The light source is arranged to project the line 12 in a first plane. As the line crosses the extrusion it will appear to deviate, as detected by a video camera 12 viewing the weld from a second plane, i.e. directly above. By detecting this deviation the camera 12 can generate a signal representative of the width of the extrusion 5, which as described above, can if desired be used to provide feedback control to a welding line.

Although a preferred embodiment of the invention has been specifically illustrated and described herein, it is to be understood that minor variations may be made in the apparatus without departing from the spirit and scope of the invention, as defined the appended claims.

What is claimed is:

1. A method of measuring the quality of a resistance weld between two overlapping sheets of metal, the formation of the weld having caused material to be flowed out adjacent the edge of each overlapped sheet to form an extrusion, the method including the steps of:

i) measuring the width of the weld extrusion on at least one side of the weld;

ii) generating a signal representative of the width of the weld extrusion; and iii) interpreting the signal in terms of the temperature of the weld.

2. A method according to claim 1, including the additional step of adjusting the temperature of the weld in response to the signal generated representing the width of the weld extrusion.

3. A method according to claim 2, wherein the measurement of the width of the weld extrusion is an optical measurement.

4. A method according to claim 1, wherein the measurement of the width of the weld extrusion is an optical measurement.

5. A method according to claim 4, wherein the optical measurement includes the steps of illuminating the area of the weld and measuring the light reflected from the weld extrusion.

6. A method according to claim 4, wherein the optical measurement includes the steps of illuminating the area of the weld with one or more lines of light at an angle to the longitudinal axis of the weld and in a first plane to the longitudinal axis of the weld and in a first plane at an angle to the plane in which the weld lies, viewing the one or more lines in a second plane at an angle to the first plane, and calculating the apparent deviation of the one or more lines as they pass over the weld extrusion.

7. A method according to claim 6, wherein the method includes the step of illuminating the area of the weld with a grid or a pattern of lines of light.

8. A method according to claim 1, including the step of measuring the width of the weld extrusion on both faces of the resistance weld.

9. A method according to claim 1, including the additional step of measuring the weld overlap.

10. A method according to claim 1, wherein the resistance weld is a weld in a side seam of a metal can.

* * * * *